United States Patent
Kolhouse et al.

(10) Patent No.: US 11,519,348 B2
(45) Date of Patent: Dec. 6, 2022

(54) SPARK PLUG CONFIGURATIONS FOR DEDICATED-EGR ENGINES

(71) Applicant: Cummins Inc., Columbus, IN (US)

(72) Inventors: J. Steven Kolhouse, Columbus, IN (US); David J. Stroh, Columbus, IN (US); Daniel J. O'Connor, Columbus, IN (US)

(73) Assignee: Cummins Inc., Columbus, IN (US)

( * ) Notice: Subject to any disclaimer, the term of this patent is extended or adjusted under 35 U.S.C. 154(b) by 113 days.

(21) Appl. No.: 16/675,600

(22) Filed: Nov. 6, 2019

(65) Prior Publication Data
US 2020/0072142 A1 Mar. 5, 2020

Related U.S. Application Data

(63) Continuation of application No. PCT/US2017/035622, filed on Jun. 2, 2017.

(51) Int. Cl.
*F02M 26/42* (2016.01)
*F02D 41/14* (2006.01)
(Continued)

(52) U.S. Cl.
CPC .......... *F02D 41/0057* (2013.01); *F02B 75/20* (2013.01); *F02D 41/1454* (2013.01);
(Continued)

(58) Field of Classification Search
CPC ..... F02P 23/04; F02P 23/045; F02D 41/0057; F02D 43/00; F02D 43/04
See application file for complete search history.

(56) References Cited

U.S. PATENT DOCUMENTS

| | | | |
|---|---|---|---|
| 7,578,281 B2 | 8/2009 | Russell et al. | |
| 7,665,452 B2 | 2/2010 | Russell et al. | |

(Continued)

FOREIGN PATENT DOCUMENTS

| | | |
|---|---|---|
| CN | 101037969 A | 9/2007 |
| CN | 101874331 A | 10/2010 |
| WO | 2015066674 A1 | 5/2015 |

OTHER PUBLICATIONS

S.Gupta Technologies for Gaseous Fueled Advanced Reciprocating Engine Systems—Argonne National Laboratory 2011 (Year: 2011).*

(Continued)

*Primary Examiner* — Michael A Kessler
(74) *Attorney, Agent, or Firm* — Taft Stettinius & Hollister LLP (57) ABSTRACT

One embodiment is a system comprising an internal combustion engine having one or more non-dedicated cylinders and one or more dedicated EGR cylinders configured to provide EGR to the engine via an EGR loop, a first spark plug coupled to each of the one or more non-dedicated cylinders, and a second spark plug coupled to each of the one or more dedicated EGR cylinders, wherein the second spark plug has a physical or dimensional characteristic that is different from the first spark plug. In certain forms each of the non-dedicated cylinders has only one of a first type of spark plug and each of the dedicated EGR cylinders has only one of a second type of spark plug. One or more of the characteristics that may vary between the first and second types of spark plugs include spark gap, electrode diameter, heat range, and ion sensing capability.

18 Claims, 2 Drawing Sheets

(51) Int. Cl.
    *F02P 15/02*     (2006.01)
    *H01T 13/20*     (2006.01)
    *F02B 75/20*     (2006.01)
    *F02D 41/00*     (2006.01)
    *F02M 26/29*     (2016.01)
    *F02B 75/18*     (2006.01)

(52) U.S. Cl.
    CPC .............. *F02M 26/42* (2016.02); *F02P 15/02* (2013.01); *F02B 2075/1824* (2013.01); *F02D 41/1446* (2013.01); *F02D 41/1448* (2013.01); *F02D 2200/0406* (2013.01); *F02D 2200/0414* (2013.01); *F02M 26/29* (2016.02); *H01T 13/20* (2013.01)

(56) References Cited

U.S. PATENT DOCUMENTS

| | | | |
|---|---|---|---|
| 7,886,729 | B2 | 2/2011 | Russell et al. |
| 9,605,645 | B2 * | 3/2017 | Monros ................... H01T 13/50 |
| 10,626,812 | B2 * | 4/2020 | Idicheria .................. F02P 23/04 |
| 2007/0215102 | A1 | 9/2007 | Russell et al. |
| 2010/0314987 | A1 | 12/2010 | Kyuno et al. |
| 2014/0142833 | A1 | 5/2014 | Gingrich et al. |
| 2014/0190458 | A1 * | 7/2014 | Gingrich ............... F02D 41/005 123/568.2 |
| 2015/0300296 | A1 | 10/2015 | Mulye et al. |
| 2015/0354477 | A1 | 12/2015 | Leone et al. |
| 2016/0097366 | A1 | 4/2016 | Kolhouse et al. |
| 2016/0097367 | A1 | 4/2016 | Geckler et al. |
| 2017/0107920 | A1 | 4/2017 | Roth et al. |

OTHER PUBLICATIONS

D.Pineda Advanced ignition for Automotive Engines University of California Berkley Spring 2017 (Year: 2017).*
https://tpsignition.com/#tps-difference. Accessed on Mar. 24, 2021 (Year: 2021).*
Chen et al. SAE International: Impact of Ignition Energy Phasing and Spark Gap on Combustion in a Homogeneous Direct Injection Gasoline SI Engine Near the EGR Limit (Year: 2013).*
Burgett et al. Measuring the Effect of Spark Plug and Ignition System Design on Engine Performance (Year: 1972).*
weaponx_performance.com Spark Plug Technical Information (WeaponX) retrieved from http://www.weaponxperformance.com/technicalPDF/SPARK_PLUG_TECH_V1.pdf on May 27, 2022. (Year: 2015).*
Archive.org capture of WeaponX document displaying document published on or before Oct. 2, 2015 (Year: 2015).*
International Preliminary Report on Patentability; International Searching Authority; International Application No. PCT/US2017/035622; dated Dec. 3, 2019; 6 pages.
International Search Report; International Searching Authority; International Application No. PCT/US2017/035622; dated Aug. 10, 2017; 2 pages.
Written Opinion of the International Searching Authority; International Searching Authority; International Application No. PCT/US2017/035622; dated Aug. 10, 2017; 5 pages.
Chinese First Office Action; The State Intellectual Property Office of People's Republic of China; Chinese Application No. 201780091412.2; dated Nov. 23, 2021; 5 pages.
Chinese Search Report; The State Intellectual Property Office of People's Republic of China; Chinese Application No. 201780091412.2; dated Nov. 15, 2021; 3 pages.

* cited by examiner

SPARK PLUG CONFIGURATIONS FOR DEDICATED-EGR ENGINES

CROSS-REFERENCE TO RELATED APPLICATION

The present application is a continuation of International Patent Application No. PCT/US2017/035622 filed on Jun. 2, 2017, which is incorporated herein by reference.

BACKGROUND

The present application relates generally to spark plug configurations and characteristics for dedicated EGR engines. Dedicated EGR engines typically include one or more cylinders which are dedicated to the provision of EGR via an EGR flow loop and one or more non-dedicated cylinders which are not involved in the provision of EGR. Dedicated EGR engines offer the potential for increased EGR quality as the fueling of one or more dedicated EGR cylinders may be controlled to provide a rich combustion mixture resulting in increased combustible exhaust constituents such as H$_2$, CO and unburned hydrocarbon. On the other hand, dedicated EGR engines pose a number of difficult and unmet challenges. For example, fueling and ignition systems of dedicated EGR engines must cope with disparate charge mixtures ranging from rich to stoichiometric to lean depending on the cylinder in question as well as the combustion controls for a given cylinder. These and other disparate operating conditions complicate to avoid undesired combustion conditions such as misfire, auto-ignition or knock, There remains a significant unmet need for the unique apparatuses, methods, systems and techniques disclosed herein.

SUMMARY OF THE DISCLOSURE

One embodiment is a unique spark plug configuration for a dedicated EGR engine. Another embodiment is a unique method of configuring spark plugs for a dedicated EGR engine. Further embodiments, forms, objects, features, advantages, aspects, and benefits shall become apparent from the following description and drawings.

DESCRIPTION OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
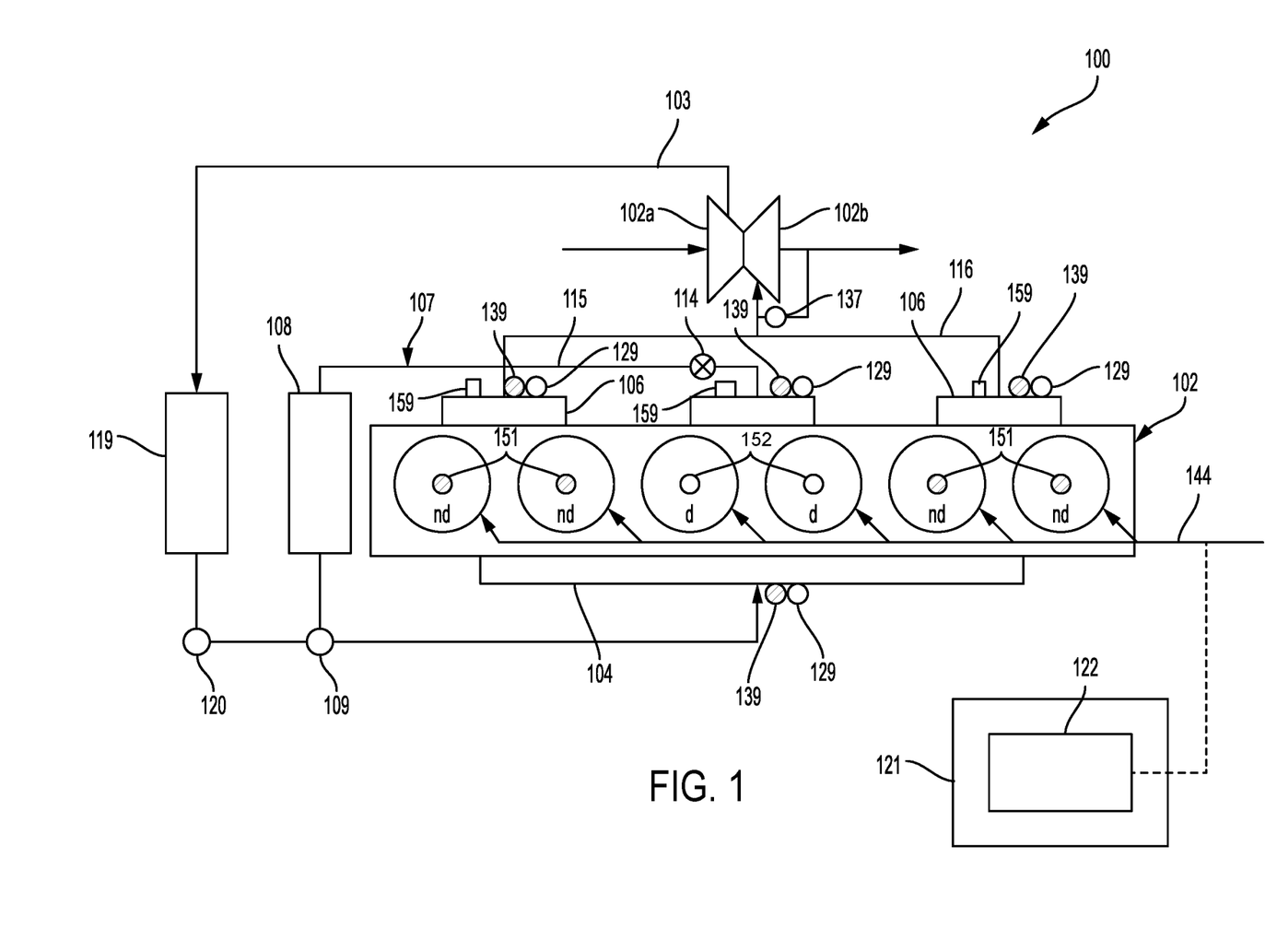
FIG. 1 is a schematic illustration of certain aspects of an exemplary dedicated EGR engine.

With reference to FIG. 1, there is illustrated a system 100 including an exemplary dedicated EGR engine 102. Engine 102 includes a plurality of cylinders including dedicated EGR cylinders designated "d" which are structured to provide EGR to EGR loop 107, and non-dedicated cylinders "nd" which are structured to provide exhaust to exhaust manifold 106. Engine 102 further includes a turbocharger including compressor 102a and turbine 102b. Turbine 102b receives exhaust from exhaust manifolds 106 via exhaust conduit 116 effective to drive compressor 102a which compresses intake air and discharges to intake conduit 103. Engine 102 is one example of a dedicated EGR engine in which the exhaust output of one or more dedicated EGR cylinders is recirculated to the engine intake during at least certain operating conditions. Dedicated EGR cylinders are generally structured to provide exhaust output which is separate from exhaust output provided by non-dedicated cylinders, during at least certain dedicated EGR operation modes.

During operation of system 100, EGR gas from the dedicated EGR cylinder is recirculated through EGR loop 107 which includes EGR valve 114 and EGR conduit 115. The EGR valve 114 is structured to selectably vary the provision of exhaust from the dedicated cylinders to EGR loop 107. The EGR loop 107 includes an EGR cooler 108 and a mixer 109. EGR is then combined with intake flow in intake conduit 103 in the mixer 109 and passed to the intake manifold 104. The mixer 109 is positioned at a location downstream of the outlet of compressor 102a, intake throttle 120, and charge air cooler 119 and upstream of intake manifold 104. In the illustrated embodiment, the mixer 109 is positioned proximate to the intake throttle 120. It shall be appreciated that in other embodiments, EGR may be introduced in various other locations and/or mechanisms in the intake air system.

System 100 further includes an electronic control system 121 including an electronic control unit 122 which may include one or more microprocessors, microcontrollers, application specific integrated circuits (ASICs), non-transitory memory devices, and communication or networking interfaces. Electronic control system 121 is operatively coupled with fueling system 144 which includes a plurality of injectors structured to inject fuel into respective ones of the dedicated EGR cylinder and the non-dedicated cylinders. In the illustrated embodiment, the injectors of fueling system 144 are provided as direct injectors which inject fuel directly into the cylinder volume and are capable of delivering fuel into the cylinder volume when the intake valve(s) and exhaust valve(s) are closed. The direct injector may be structured to inject fuel at the top of the cylinder. In certain embodiments, one or more direct injectors may be structured to inject fuel into a corresponding one or more combustion pre-chambers.

Electronic control system 121 is structured to execute control operations effective to control fueling of the dedicated EGR cylinder and the non-dedicated cylinders independently from one another. Such independent control permits the non-dedicated cylinders to be controlled in a first combustion mode (e.g., to provide stoichiometric combustion during operation of engine 102) and the dedicated EGR cylinder to be controlled in a second combustion mode which may differ from the first combustion mode (e.g., to provide rich combustion effective to generate exhaust gasses having characteristics which enhance the quality of EGR such as higher amounts of H$_2$, CO and unburned hydrocarbons). The air to fuel ratio is the mass ratio of air to fuel present in a combustion process in an internal combustion engine. If exactly enough air is provided to completely burn all of the fuel, the ratio is stoichiometric. If the ratio is less than 1 then too much fuel is provided and the mixture is rich. If the ratio is greater than 1 then too much air is provided and the mixture is lean.

In the illustrated embodiment, electronic control system 121 is also structured to control the position of intake throttle 120, EGR valve 114, and a wastegate 137 or variable geometry actuator which is provided in connection with turbine 102b. Electronic control system 121 may be further structured to control the operation of other electronically controllable components associated with engine 102 or system 100. Electronic control system 121 is further structured to receive input from a number of sensors associated with system 100. For example, lambda or $O_2$ sensors 159 are structured to provide to electronic control system 121 information indicative of the air-fuel ratio of the exhaust output by the non-dedicated cylinders and the air-fuel ratio of the exhaust output by the dedicated EGR cylinders. Temperature sensors 129 are structured to provide to electronic control system 121 information indicative of the temperature of the intake air provided to intake manifold 104 as well as the temperature of the exhaust output to exhaust manifold 106 by the non-dedicated cylinders and the exhaust output by the dedicated EGR cylinders. Pressure sensors 139 are structured to provide information regarding intake flow or exhaust to the electronic control system 121.

In the exemplary embodiment of FIG. 1, system 100 includes a direct EGR engine 102 which is provided as a turbocharged, six-cylinder, spark ignition (SI) engine with direct in-cylinder injection. It shall be appreciated engine 102 may be provided in a variety of alternate forms varying from the illustrated embodiment in a number of respects. Engine 102 may be provided with additional or alternately-configured turbochargers or may be provided as a non-turbocharged or naturally aspirated engine. Engine 102 may be provided with a different number of cylinders and a different number of dedicated EGR cylinders, for example, as a four cylinder engine with one dedicated EGR cylinder and three non-dedicated cylinders. Regardless of the total number of cylinders, the number of dedicated EGR cylinders may vary as a fixed design parameter, as a controllable system operating parameter by selecting which of a plurality of dedicated EGR cylinders is flow coupled with the EGR loop, or both. Engine 102 may also be provided as a compression ignition engine such as a diesel engine or a dual fuel engine.

It shall be appreciated that system 100 and engine 102 may be provided in a variety of alternate forms varying from the illustrated embodiment in a number of respects. In certain forms a dedicated throttle may be structured to selectably control the provision of charge air to the dedicated EGR cylinder independently from the non-dedicated cylinders. Further details of a number of examples of variation in the form and structure of system 100 and engine 102 may be found in commonly assigned U.S. Pat. No. 9,631,582 issued on Apr. 25, 2017 and entitled TECHNIQUES FOR CONTROLLING A DEDICATED EGR ENGINE the disclosure of which is hereby incorporated by reference.

As illustrated in FIG. 1, the non-dedicated cylinders of engine 102 are operatively coupled with respective ones of a first type of spark plug 151 and dedicated cylinders of engine 102 are operatively coupled with respective ones of a second type of spark plug 152. The first type of spark plug 151 has physical characteristics adapted for combustion conditions of the non-dedicated cylinders. The second type of spark plug 152 has physical characteristics differing from those of the first type of spark plug and adapted for combustion conditions of the dedicated cylinders which may be run rich, stoichiometric or lean depending on the operating state of the engine.

Figure 2:
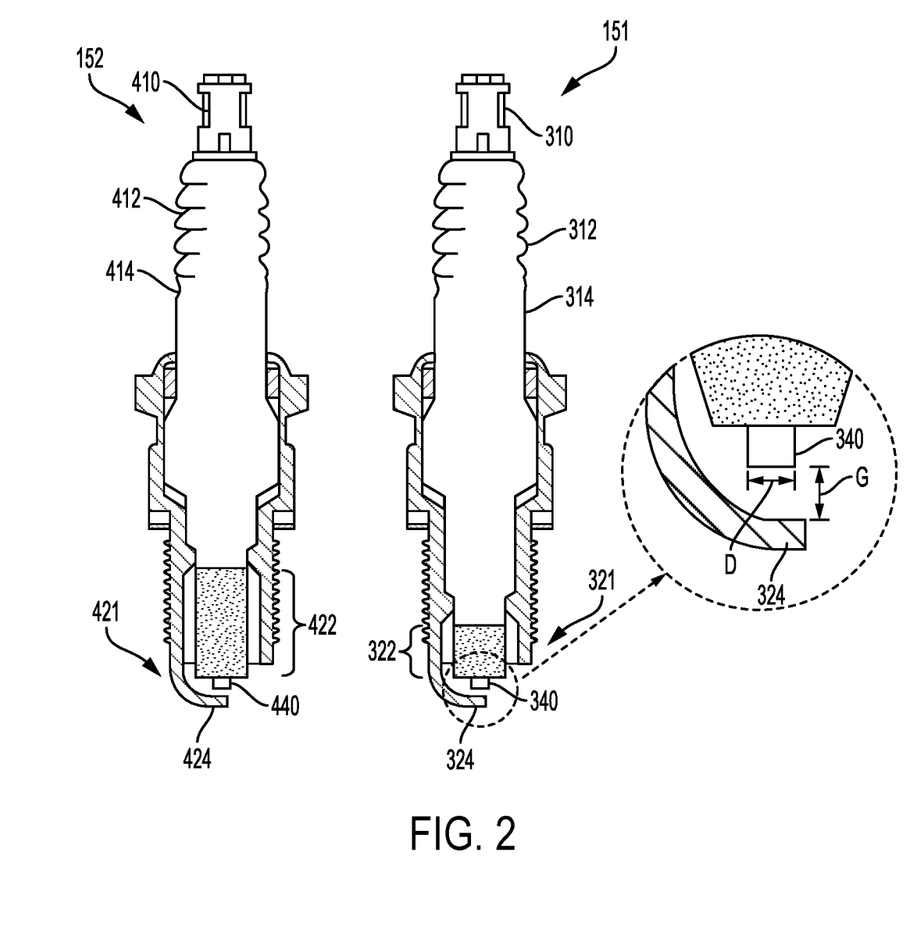
FIG. 2 is a schematic illustration of a spark plug.

FIG. 2 schematically shows an exemplary embodiment of a first type of spark plug 151 that is configured for use in the non-dedicated cylinder and a second type of spark plug 152 that is configured for use in the dedicated cylinder. While the first type of spark plug 151 and other types of spark plugs can be used in the non-dedicated cylinders of FIG. 1, it should be understood that first type of spark plug 151 is just one example of a spark plug device and other types of spark plug devices may be used. Likewise, while the second type of spark plug 152 is used in the dedicated EGR cylinders of FIG. 1, it should be understood that the second type of spark plug is just one example of a spark plug that can be used in the dedicated EGR cylinders.

The first type of spark plug 151 and the second type of spark plug 152 include a number of generally similar components and characteristics. A number of such similar characteristics are illustrated with reference numerals in the 300's for the first type of spark plug 151 and corresponding reference numerals in the 400s (i.e., incremented by 100) for the second type of spark plug 152. In the interest of brevity, such substantially similar characteristics are described only in connection with the first type of spark plug 151. It shall nevertheless be appreciated that this description is also generally applicable to the second type of spark plug 152.

The second type of spark plug 152 also has one or more physical characteristics that differ from the first type of spark plug 151. These physical characteristics are discussed in more detail below and may be individually in or combined together in any combination in a single spark plug. The second type of spark plug 152 is coupled to the dedicated EGR cylinder and enables the second type of spark plug to run hotter or at a higher temperature than the first type of spark plug coupled to the non-dedicated cylinder. The unique configuration of the second type of spark plug in the dedicated EGR cylinder will help to detect and/or minimize the carbon build up and spark plug fouling within the dedicated EGR cylinders. Spark plug fouling can happen for many reasons and generally occurs when the spark plug fails to fire and ignite the air to fuel mixture which causes a misfire.

Spark plug 151 has a generally cylindrical shape, in which an upper portion is located outside of the combustion chamber and a spark plug tip 321 is located within the combustion chamber. The protrusion of the spark plug tip 321 into the combustion chamber is a measure of the tip protrusion. In certain embodiments, the tip protrusion of the spark plug tip 421 of the second type of spark plug 152 that is assembled with the dedicated EGR cylinder is farther or deeper into the dedicated EGR cylinder as compared to the tip protrusion of spark plug tip 321 of the first type of spark plug 151 that is assembled with the non-dedicated cylinder. A larger or deeper tip protrusion of the spark plug tip 421 into the dedicated EGR cylinder improves ignitability, enables the second type of spark plug to run hotter or at a higher temperature than the first type of spark plug, and reduces carbon build-up on the second type of spark plug. The tip protrusion is one example of a physical or dimensional characteristic that in some embodiments is different between the first type of spark plug 151 associated with the non-dedicated cylinder and the second type of spark plug 152 associated with the dedicated EGR cylinder. The upper portion includes a terminal 310, which may be coupled to an ignition system, enabling electric current to flow from the ignition system into a conductive inner core of the spark plug 151. In some embodiments, terminal 310 may be configured to receive electric current for performing a spark. In some embodiments, the terminal 310 may also be configured to receive a second electric current for powering a spark plug heating system of the spark plug 151. Alternatively, spark plug 151 may not include a heating system.

As illustrated in FIG. 2, the spark plug 151 includes an insulating portion 314 surrounding a conductive inner core (not shown). In some examples, insulating portion 314 may contain one or more surface ribs 312 used to improve insulation of the spark plug 151 and prevent electrical energy from leaking from the terminal to the conductive portion along the side of the spark plug. In some examples, insulating portion 314 may include aluminum oxide ceramic; however, other materials may be used. The more exposed insulating portion 314 then the hotter the spark plug 151 will be compared to a shorter insulating portion which are usually cooler plugs. The hotter spark plugs are made with a lengthened path to the metal body. Additionally, the thermally conductive metal core of the center electrode will also affect how hot or cold the spark plug will be.

Spark plug tip 321 includes a center electrode communicating electrically with terminal 310 via an internal conductive core. The center electrode has an end portion 340 that extends from the insulating portion 314 towards a ground electrode 324. The end portion 340 has an electrode diameter as indicated by arrow "D" and a gap distance between the tip of end portion 340 and ground electrode 324 as indicated by arrow "G". In the illustrated embodiment the end portion 340 is substantially cylindrical. In further embodiments the end portion 340 may be tapered along its length or have a different cross-sectional shape. In such instances the diameter D can be considered the diameter at the tip of the end portion 340. In certain embodiments, the electrode diameter of the second type of spark plug 152 that is associated with the dedicated EGR cylinder is smaller than the electrode diameter of the first type of spark plug 151 that is associated with the non-dedicated cylinder. A smaller electrode diameter can provide better ignitability of the second type of spark plug 152 or a higher spark temperature as the spark jumps between the ground electrode 424 and end portion 440 of the center electrode. One benefit of a higher spark temperature is less carbon build-up on the second type of spark plug 152 in the dedicated EGR cylinder. Another benefit of a smaller electrode diameter of the second type of spark plug 152 is a higher spark temperature as explained in more detail below and enhanced combustion. As can be appreciated, the heat loss can be greater from wider or larger electrode diameter. A smaller electrode diameter absorbs less energy and also improves efficiency of energy from ignition into heat by the spark. In some embodiments, the material of the center electrode of the second type of spark plug 152 is different than the material of the center electrode of the first type of spark plug 151 although the diameters may be the same. One benefit of a different material in combination with a smaller diameter can be improved wear of the center electrode. The electrode diameter D is one example of a physical or dimensional characteristic that in some embodiments is different between the first type of spark plug 151 associated with the non-dedicated cylinder and the second type of spark plug 152 associated with the dedicated EGR cylinder. Alternatively, in some embodiments the electrode diameter D of the first type of spark plug 151 is the same size as the electrode diameter of the second type of spark plug 152. Generally, the electrode diameter D is between 0.5 millimeters to 1.5 millimeters. In some embodiments, the electrode diameter D is between 0.5 millimeters to 0.75 millimeters. In another form, the difference between the electrode diameter D of the second type of spark plug 152 and the electrode diameter D of the first type of spark plug 151 is 0.2 to 0.3 millimeters.

The spark plug 151 also includes a ground electrode 324 coupled to a conductive portion of the spark plug 151. The ground electrode 324 extends from the insulating portion 314 towards the tip of end portion 340 of the center electrode. In the illustrated embodiment, the ground electrode 324 has a convex or J shape with a substantially rectangular cross-section. In further embodiments, the ground electrode 324 may have a different shape, may taper along its length, and/or may have a different cross-sectional shape. In additional embodiments, two or more of the ground electrodes 324 may be coupled to the conductive portion of the spark plug 151. The shape of the ground electrode is one example of a physical or dimensional characteristic that in some embodiments is different between the first type of spark plug 151 associated with the non-dedicated cylinder and the second type of spark plug 152 associated with the dedicated EGR cylinder. Alternatively, in some embodiments the shape of the ground electrode of the first type of spark plug 151 can be the same size, respectively, as the shape of the ground electrode of the second type of spark plug 152.

The spark plug 151 is configured to receive a voltage difference between the center electrode and the ground electrode 324. As the voltage increases the gases in the vicinity of the spark plug 151 begin to change. Once the voltage across the spark plug or between the center electrode and ground electrode 324 exceeds the dielectric strength of the gases, the gases may become ionized. Generally, an ionized gas is a conductor which allows the current to flow across the gap distance G. The flow of current across the gap distance G causes a temperature increase near the spark plug thereby initiating combustion of the air and fuel mixture. The gap distance G also has an effect on length of spark produced. A larger gap distance G produces a longer spark that has more exposure to the air and fuel mixture which increases the spark temperature. In certain embodiments the gap distance indicated by arrow "G" may vary between the first type of spark plug 151 and the second type of spark plug 152. In one embodiment, the gap distance of the second type of spark plug is greater than the gap distance of the first type of spark plug 151. For example, the gap distance of the second type of spark plug 152 is between 0.040 and 0.050 inches and the gap distance of the first type of spark plug 151 is between 0.035 and 0.050 inches. In another example, the gap distance of the second type of spark plug 152 is about 5 to 25% higher than the gap distance of the first type of spark plug 151 and in some forms the gap distance is about 10 to 20% higher. A larger gap distance results in a higher spark temperature as the spark jumps between the ground electrode 324 and the end portion 340 of the center electrode and/or extends the amount of time to close or foul the gap distance due to accumulation of carbon deposits. The spark temperature or spark temperature range can vary for the first type of spark plug 151 and the second type of spark plug 152. In one embodiment, the first type of spark plug 151 is configured to perform a first spark to a first spark temperature or temperature range and the second type of spark plug 152 is configured to perform a second spark to a second temperature or temperature range wherein the second temperature range is higher than the first temperature range. The gap distance is one example of a physical or dimensional characteristic that in some embodiments is different between the first type of spark plug 151 associated with the non-dedicated cylinder and the second type of spark plug 152 associated with the dedicated EGR cylinder. Alternatively, in some embodiments the gap distance of the first type of spark plug 151 can be the same size, respectively, as the gap distance of the second type of spark plug 152.

Conductive portion can perform various functions and is made of an electrically conductive metal that enables electric current to flow between the ground electrode 324 and wall of the combustion chamber, thereby grounding the ground electrode 324. Furthermore, the conductive portion can be used to transfer heat between the spark plug 151 and the wall of the combustion chamber.

The heat range of the spark plug 151 indicates the operating temperature of the spark plug 151 which correlates with the built-in fouling resistance of the spark plug 151 as well as the risk of undesired auto-ignition, pre-ignition, knock or detonation. In other words, the heat range is the measure of how fast the spark plug 151 dissipates combustion heat. The heat range of the spark plug 151 is typically hot enough to prevent fouling but not so hot that the spark plug 151 increases the risk of auto-ignition, pre-ignition, knock and detonation. The heat range of the spark plug 151 is not too cold or low that an incomplete combustion or formation of carbon buildup on the tip 321 occurs. The material composition, size, and shape of various portions of the spark plug 151 may affect the heat range of the first type of spark plug 151 and the second type of spark plug 152. Generally, the heat range controls the maximum temperature of center electrode. As discussed above as the electrode diameter size decreases, more heat energy is put into the spark and the more ignitable the spark plug becomes. A smaller electrode diameter results in a hotter or higher temperature of the center electrode however if the electrode diameter becomes too small then center electrode will degrade and wear down.

In one respect variation in the length of the spark plug tip influences its heat range. For example, the shorter length 322 of tip 321 of the first type of spark plug 151 relative to the longer length 422 of tip 421 of the second type of spark plug 152 provides greater heat transfer in the first type of spark plug 151 causing it to operate cooler or at a lower heat range. Furthermore, by varying the length, width, and/or material of various portions, the heat range and therefore the operating temperature of the first type of spark plug 151 may be varied. In one example, the relative amount of material comprising insulating portion 314 may be reduced compared to conductive portion, thereby increasing the rate of heat transfer from the spark plug tip 321 and decreasing the spark temperature of the spark plug 151 for a given condition of the engine. In another example, the length of the center electrode extending beyond the insulating portion 314 of the spark plug tip 321 may be increased, thereby increasing the spark temperature at the tip of the center electrode 321 for a given engine condition. In another example, the electrode diameter of the center electrode may be decreased, thereby increasing the spark temperature. It should be appreciated that additional variations in the design of the spark plug 151 for various heat ranges and operating conditions may be used. In one embodiment, the heat range of the second type of spark plug 152 is higher than the heat range of the first type of spark plug 151. As such, the higher heat range of the second type of spark plug 152 coupled with the dedicated EGR cylinder enables the second type of spark plug to operate at a higher temperature. Beneficially, operating the second type of spark plug at a higher heat range results in less build-up of carbon deposits on the spark plug in the dedicated EGR cylinder. In combination with the higher heat range, operating the second type of spark plug in a combustion mode that is rich will result in less build-up of carbon deposits on the spark plug. The heat range is one example of a physical or dimensional characteristic that in some embodiments is different between the first type of spark plug 151 associated with the non-dedicated cylinder and the second type of spark plug 152 associated with the dedicated EGR cylinder. Alternatively, in some embodiments the heat range of the first type of spark plug 151 can be the same, respectively, as the heat range of the second type of spark plug 152.

Ion sensing is one method of determining when a cylinder is knocking. One example of ionization current sensing is obtained by applying a sense voltage on the spark plug 151 when the spark plug 151 is not used for firing. The sensed current depends on the ions created, on their relative concentration and recombination, on pressure, and on temperature to name a few factors. Ion sensing can determine whether a single non-dedicated or dedicated EGR cylinder is knocking, misfiring, or malfunctioning. In some embodiments, ion sensing may be used only when the spark plug 151 and/or spark plug 152 is not performing a spark. However, in some embodiments, ion sensing may be used at any time, even during spark formation.

The following Table A illustrates the characteristics that may vary between the first and second types of spark plugs include heat range, spark gap, electrode diameter, tip protrusion, and spark temperature. As can be appreciated, the first type of spark plug is coupled with the non-dedicated cylinder and the second type of spark plug is coupled with the dedicated EGR cylinder. As discussed previously, any one or combination of characteristics A, C, E, G, and I may be included in the first type of spark plug. Also any one or combination of characteristics B, D, F, H, and J may be included in the second type of spark plug. Generally, the relationship for the first type of spark plug relative to the second type of spark plug includes one or more of the following characteristics: A is less than B, C is less than D, E is greater than F, H is greater than G, and J is greater than I.

TABLE A

| Cylinder Type | Cylinder Number | Heat Range | Spark Gap | Electrode Diameter | Tip Protrusion | Spark Temperature |
|---|---|---|---|---|---|---|
| Non-dedicated cylinder | 1 | A | C | E | G | I |
| Non-dedicated cylinder | 2 | A | C | E | G | I |
| Dedicated EGR cylinder | 3 | B | D | F | H | J |

TABLE A-continued

| Cylinder Type | Cylinder Number | Heat Range | Spark Gap | Electrode Diameter | Tip Protrusion | Spark Temperature |
|---|---|---|---|---|---|---|
| Dedicated EGR cylinder | 4 | B | D | F | H | J |
| Non-dedicated cylinder | 5 | A | C | E | G | I |
| Non-dedicated cylinder | 6 | A | C | E | G | I |

In one aspect of the present disclosure, a system includes an internal combustion engine having one or more non-dedicated cylinders and one or more dedicated EGR cylinders configured to provide EGR to the engine via an EGR loop, one or more first spark plugs coupled to each of the one or more non-dedicated cylinders, the first spark plugs including first physical characteristics, and one or more second spark plugs coupled to each of the one or more dedicated EGR cylinders, the second spark plugs including second physical characteristics, wherein the second physical characteristics differ from the first physical characteristics effective to provide different spark plug geometries of the second spark plugs relative to the first spark plugs. The system can include wherein each of the one or more non-dedicated cylinders has only one of the first spark plugs, and each of the one or more dedicated EGR cylinders has only one of the second spark plugs. In another aspect, the system also includes an electronic control system operatively coupled to the one or more non-dedicated cylinders and the one or more dedicated EGR cylinders, the electronic control system is configured to control the one or more non-dedicated cylinders in a first combustion mode, and the electronic control system is configured to control the one or more dedicated EGR cylinders in a second combustion mode. In this embodiment, the system may further include the first combustion mode is stoichiometric, and the second combustion mode is rich.

Optionally, the system further includes the different spark plug geometries including the first spark plug has a first spark gap and the second spark plug has a second spark gap that is greater than the first spark gap. The system can include the different spark plug geometries including the first spark plug has a first electrode diameter and the second spark plug has a second electrode diameter that is smaller than the first electrode diameter. The system can include only the first spark plugs are operatively coupled with the one or more non-dedicated cylinders and only the second spark plugs are operatively coupled with the one or more dedicated cylinders. The system can include the internal combustion engine being a six-cylinder engine wherein two cylinders are dedicated EGR cylinders. The system can include the different spark plug geometries being the first spark plug has a first heat range and the second spark plug has a second heat range that is greater than the first heat range.

In another aspect of the present disclosure, a system includes an internal combustion engine having one or more non-dedicated cylinders and one or more dedicated EGR cylinders configured to provide EGR to the engine via an EGR loop, wherein each of the one or more non-dedicated cylinders has only one of a first spark plug, the first spark plug is configured to perform a first spark to a first temperature range, and wherein each of the one or more dedicated EGR cylinders has only one of a second spark plug, the second spark plug is configured to perform a second spark to a second temperature range wherein the second temperature range is higher than the first temperature range. In one form, the system includes the second spark plug having a physical or dimensional characteristic that is different from the first spark plug, wherein the second physical characteristic differs from the first physical characteristic effective to provide a different spark plug geometry of the second spark plug relative to the first spark plug. In one form, the system includes the different spark plug geometry being the first spark plug has a first spark gap, and the second spark plug has a second spark gap that is greater than the first spark gap. The system can further include the different spark plug geometry being the first spark plug has a first heat range and the second spark plug has a second heat range that is higher than the first heat range. In one form, the system includes the different spark plug geometry being the first spark plug having a first electrode diameter and the second spark plug having a second electrode diameter that is smaller than the first electrode diameter.

In another form, the system includes wherein the first spark plug has a first tip protrusion into the non-dedicated cylinder, the second spark plug has a second tip protrusion into the dedicated EGR cylinder that is greater than the first tip protrusion. In another aspect, the system further includes an electronic control system operatively coupled to the one or more non-dedicated cylinders and the one or more dedicated EGR cylinders, the electronic control system is configured to control the one or more non-dedicated cylinders in a first combustion mode, and the electronic control system is configured to control the one or more dedicated EGR cylinders in a second combustion mode. In yet another aspect, the system includes the first combustion mode is stoichiometric, and the second combustion mode is stoichiometric.

In another aspect of the present disclosure, a method of operating an internal combustion engine includes providing a dedicated EGR engine having one or more non-dedicated cylinders and one or more dedicated EGR cylinders, each of the one or more non-dedicated cylinders having only a first spark plug, the first spark plug having first physical characteristics, and each of the one or more dedicated EGR cylinders having only a second spark plug, the second spark plug including second physical characteristics, wherein the second physical characteristics differ from the first physical characteristics effective to provide different spark plug geometries of the second spark plug relative to the first spark plug; providing an electronic control system operatively coupled to the one or more non-dedicated cylinders and the one or more dedicated EGR cylinders; and controlling with the electronic control system the one or more non-dedicated cylinders in a first combustion mode and the one or more dedicated EGR cylinders in a second combustion mode. In one form, the method can include the first combustion mode is stoichiometric, and the second combustion mode is stoichiometric. In one aspect, the method further includes energizing the first spark plug within the non-dedicated cylinder to emit a first spark having a first temperature and energizing the second spark plug within the dedicated EGR cylinder to emit a second spark having a second temperature, wherein the second temperature is higher than the first temperature.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine having one or more non-dedicated cylinders and one or more dedicated Exhaust Gas Recirculation (EGR) cylinders configured to provide EGR to the engine via an EGR loop;
one or more first spark plugs coupled to each of the one or more non-dedicated cylinders, the first spark plugs including first physical characteristics;
one or more second spark plugs coupled to each of the one or more dedicated EGR cylinders, the second spark plugs including second physical characteristics, wherein the second physical characteristics differ from the first physical characteristics effective to provide different spark plug geometries of the second spark plugs relative to the first spark plugs, wherein the different spark plug geometries include the first spark plug has a first electrode diameter and the second spark plug has a second electrode diameter that is smaller than the first electrode diameter, and further wherein the different spark plug geometries include the first spark plug has a first tip protrusion into the non-dedicated cylinder, the second spark plug has a second tip protrusion into the dedicated EGR cylinder that is greater than the first tip protrusion such that the first tip protrusion into the non-dedicated cylinder is less than the second tip protrusion; and
an electronic control system operatively coupled to the one or more non-dedicated cylinders and the one or more dedicated EGR cylinders, the electronic control system is structured to execute control operations to control fueling of the one or more dedicated EGR cylinders and to control fueling of the one or more non-dedicated cylinders independently from the one or more dedicated EGR cylinders,
wherein the electronic control system is configured to control the one or more non-dedicated cylinders in a first combustion mode, and the electronic control system is configured to control the one or more dedicated EGR cylinders in a second combustion mode.

2. The system of claim 1, wherein each of the one or more non-dedicated cylinders has only one of the first spark plugs, and each of the one or more dedicated EGR cylinders has only one of the second spark plugs.

3. The system of claim 1, wherein the first combustion mode is stoichiometric, and the second combustion mode is rich.

4. The system of claim 1, wherein the different spark plug geometries include the first spark plug has a first spark gap and the second spark plug has a second spark gap that is greater than the first spark gap.

5. The system of claim 1, wherein only the first spark plugs are operatively coupled with the one or more non-dedicated cylinders and only the second spark plugs are operatively coupled with the one or more dedicated cylinders.

6. The system of claim 1, wherein the internal combustion engine is a six cylinder engine wherein two cylinders are dedicated EGR cylinders.

7. The system of claim 1, wherein the different spark plug geometries include the first spark plug has a first heat range and the second spark plug has a second heat range that is greater than the first heat range.

8. A system, comprising:
an internal combustion engine having one or more non-dedicated cylinders and one or more dedicated Exhaust Gas Recirculation (EGR) cylinders configured to provide EGR to the engine via an EGR loop, wherein each of the one or more non-dedicated cylinders has only one of a first spark plug, the first spark plug is configured to perform a first spark to a first temperature range, and wherein each of the one or more dedicated EGR cylinders has only one of a second spark plug, the second spark plug is configured to perform a second spark to a second temperature range wherein the second temperature range is higher than the first temperature range, wherein the first spark plug has a first tip protrusion into the non-dedicated cylinder, the second spark plug has a second tip protrusion into the dedicated EGR cylinder that is greater than the first tip protrusion such that the first tip protrusion into the non-dedicated cylinder is less than the second tip protrusion; and
an electronic control system operatively coupled to the one or more non-dedicated cylinders and the one or more dedicated EGR cylinders, the electronic control system is structured to execute control operations to control fueling of the one or more dedicated EGR cylinders and to control fueling of the one or more non-dedicated cylinders independently from the one or more dedicated EGR cylinders, the electronic control system is configured to control the one or more non-dedicated cylinders in a first combustion mode, and the electronic control system is configured to control the one or more dedicated EGR cylinders in a second combustion mode.

9. The system of claim 8, wherein the second spark plug has a physical or dimensional characteristic that is different from the first spark plug, wherein the second physical characteristic differs from the first physical characteristic effective to provide a different spark plug geometry of the second spark plug relative to the first spark plug.

10. The system of claim 9, wherein the different spark plug geometry includes the first spark plug has a first spark gap, and the second spark plug has a second spark gap that is greater than the first spark gap.

11. The system of claim 9, wherein the different spark plug geometry includes the first spark plug has a first heat range and the second spark plug has a second heat range that is higher than the first heat range.

12. The system of claim 9, wherein the different spark plug geometry includes the first spark plug has a first electrode diameter and the second spark plug has a second electrode diameter that is smaller than the first electrode diameter.

13. The system of claim 8, wherein the first combustion mode is stoichiometric, and the second combustion mode is stoichiometric.

14. A method of operating an internal combustion engine, the method comprising:
provide a dedicated Exhaust Gas Recirculation (EGR) engine having one or more non-dedicated cylinders and one or more dedicated EGR cylinders, each of the one or more non-dedicated cylinders having only a first spark plug, the first spark plug having first physical characteristics, and each of the one or more dedicated EGR cylinders having only a second spark plug, the second spark plug including second physical characteristics, wherein the second physical characteristics differ from the first physical characteristics effective to provide different spark plug geometries of the second spark plug relative to the first spark plug, wherein the different spark plug geometries include the first spark plug has a first tip protrusion into the non-dedicated cylinder, the second spark plug has a second tip protrusion into the dedicated EGR cylinder that is greater than the first tip protrusion such that the first tip protrusion into the non-dedicated cylinder is less than the second tip protrusion;

providing an electronic control system operatively coupled to the one or more non-dedicated cylinders and the one or more dedicated EGR cylinders;

controlling with the electronic control system fueling of the one or more dedicated EGR cylinders and controlling fueling of the one or more non-dedicated cylinders independently from the one or more dedicated EGR cylinders; and controlling with the electronic control system the one or more non-dedicated cylinders in a first combustion mode and the one or more dedicated EGR cylinders in a second combustion mode.

15. The method of claim 14, wherein the first combustion mode is stoichiometric, and the second combustion mode is stoichiometric.

16. The method of claim 14, further comprising:
energizing the first spark plug within the non-dedicated cylinder to emit a first spark having a first temperature; and
energizing the second spark plug within the dedicated EGR cylinder to emit a second spark having a second temperature, wherein the second temperature is higher than the first temperature.

17. The system of claim 1, wherein the first combustion mode is stoichiometric, and the second combustion mode is lean.

18. The system of claim 1, wherein the first combustion mode is stoichiometric, and the second combustion mode is stoichiometric.

* * * * *